(No Model.)

J. THOMSON.
MECHANISM FOR CONTROLLING THE ACTION OF OSCILLATING DISKS.

No. 452,485. Patented May 19, 1891.

Witnesses
Geo. W. Breck.
Edward Thorpe.

Inventor:
John Thomson.

UNITED STATES PATENT OFFICE.

JOHN THOMSON, OF BROOKLYN, ASSIGNOR TO THE THOMSON METER COMPANY, OF NEW YORK, N. Y.

MECHANISM FOR CONTROLLING THE ACTION OF OSCILLATING DISKS.

SPECIFICATION forming part of Letters Patent No. 452,485, dated May 19, 1891.

Application filed January 3, 1891. Serial No. 376,660. (No model.)

*To all whom it may concern:*

Be it known that I, JOHN THOMSON, a citizen of the United States, residing at Brooklyn, Kings county, New York, have invented certain new and useful Improvements in Mechanism for Controlling the Action of Oscillating Disks, of which the following is a specification.

This invention relates to oscillating-disk actions; and it consists in mechanism for controlling the movement of the disk fully set forth hereinafter, and illustrated in the accompanying drawings, in which—

Figure 1:
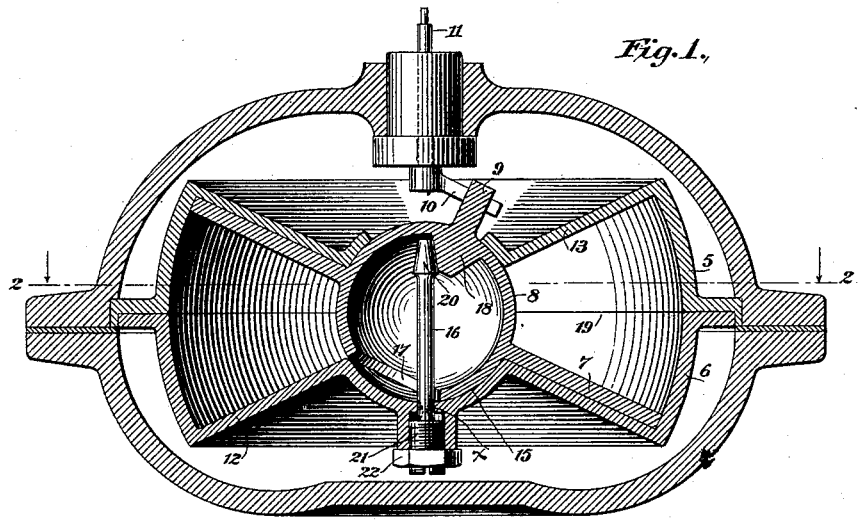
Figure 2:
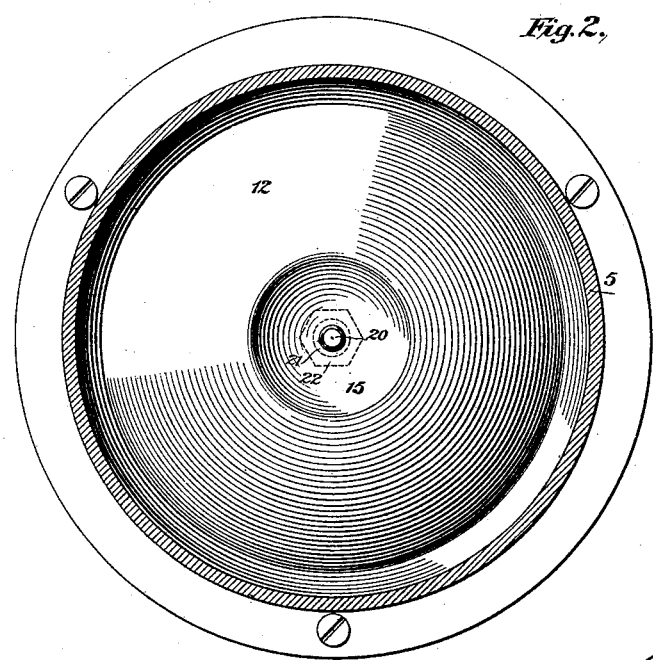

Figure 1 is a central transverse section through a casing, disk-chamber, and disk, (the arrangement being such as might be employed in water-meters,) showing my improvement as applied thereto. Fig. 2 is a detail top plan view of the lower section of the disk-chamber casing.

It is not thought necessary to here describe the action of the disk, as it is well understood by mechanicians; but in this connection reference may be made to my patents, Nos. 387,828 and 387,829. The disk-chamber as usually constructed is in a casing formed of two sections—an upper 5 and a lower 6. Operating within this chamber is the disk 7 with its ball 8. On the upper and outer portion of the ball is a hub 9, which engages an arm 10, secured to a shaft 11. The hub may thus either transmit its motion to the shaft or the shaft may cause the movement of the hub and disk. Now, bearing in mind that the oscillation of the disk produces in its central axis at a right angle to the plane of the disk rotating or gyrating motion, the means hereinafter set forth for controlling the proper motion of the disk—that is, to maintain contact with the frustums 12 13 of the chamber—will be readily understood. Thus the control of the disk is effected by attaching to the center of the socket 15 of the lower section of the disk-casing a spindle 16, which projects through the opening 17 to the interior of the ball to constitute a bearing for another bearing of the disk—as, for instance, a conical stud 18, adapted to engage the end of the spindle. The axis of the stud 18 is at a right angle to the horizontal plane of the disk. The axis of the spindle is in the center of the disk-chamber vertical to the plane 19 thereof. The consequence of this arrangement and disposal is that the bearing of the disk—i. e., the conical stud formed upon the interior surface of the ball—gyrates in a circle around the bearing of the spindle, which latter thus prevents the disk from leaving the frustums of the measuring-chamber.

The bearing-tip 20 of the spindle may be made conical, as shown, as such form, in connection with the threaded end 21 and jam-nut 22, permits of ready adjustment; but this is not essential as a cylindrical tip or other form of bearing, but will operate effectively. It is also evident that a roller might be mounted either upon the end of the spindle or upon the stud, and that a considerable degree of elasticity may be permitted in the spindle, as by reducing its diameter, as shown in dotted lines $x$, whereby to relieve the disk in event of the introduction of matter liable to derange the device.

Without limiting myself to the precise construction set forth, I claim—

1. In an oscillating-disk action, a disk, ball, and stationary bearing within the ball, arranged to receive the thrust of a gyrating bearing carried by the disk, substantially as set forth.

2. The combination, with the oscillating disk and ball, of a stationary bearing extending within the ball and a stud formed upon the interior of the ball, arranged to make contact with and gyrate around the said stationary bearing, substantially as set forth.

3. In an oscillating-disk action, the combination of the chamber, disk, and ball with the conical stud formed within the ball and the spindle fast to the chamber, projecting into the ball, and adapted to engage the stud to control the action of the disk, substantially as set forth.

4. In an oscillating-disk action, a central bearing supported to yield laterally under pressure and a bearing carried by the disk, arranged to make contact with and travel on the central bearing, substantially as set forth.

In testimony whereof I have signed my name to this specification in the presence of two subscribing witnesses.

JOHN THOMSON.

Witnesses:
FRANK LAMBERT,
EDWD. K. ANDERTON.